US012775710B2

(12) United States Patent
Hoche et al.

(10) Patent No.: US 12,775,710 B2
(45) Date of Patent: Oct. 27, 2026

(54) CONFIGURING EXECUTION OF A SERVICE IN A DISTRIBUTED SERVICES SYSTEM

(71) Applicant: STRIPE, LLC, South San Francisco, CA (US)

(72) Inventors: Soucindar Hoche, San Francisco, CA (US); Christopher James Whiten, Smiths Falls (CA); Lee Ha, Huntington Beach, CA (US); Roja Bandari, San Francisco, CA (US); Yashu Pura Lingaraju, Seattle, WA (US); Luvsandondov Lkhamsuren, Ewa Beach, HI (US); Gael Loic Ollivier, Irvine, CA (US); Matthias Maurice Arturo Rivollier, San Francisco, CA (US); Eli Kollman, San Francisco, CA (US); Evan Andrews, Ithaca, NY (US); Moeez Ali Syed, Bellevue, WA (US)

(73) Assignee: Stripe, LLC, South San Francisco, CA (US)

( * ) Notice: Subject to any disclaimer, the term of this patent is extended or adjusted under 35 U.S.C. 154(b) by 0 days.

(21) Appl. No.: 18/752,281

(22) Filed: Jun. 24, 2024

(65) Prior Publication Data

US 2025/0390579 A1 Dec. 25, 2025

(51) Int. Cl.
*G06F 21/00* (2013.01)
*G06F 21/57* (2013.01)

(52) U.S. Cl.
CPC ........ *G06F 21/57* (2013.01); *G06F 2221/033* (2013.01)

(58) Field of Classification Search
CPC ........................... G06F 21/57; G06F 2221/033
See application file for complete search history.

(56) References Cited

U.S. PATENT DOCUMENTS

| | | | | |
|---|---|---|---|---|
| 2019/0362071 | A1* | 11/2019 | Bender | H04L 63/1425 |
| 2020/0134628 | A1* | 4/2020 | Jia | G06N 20/00 |
| 2022/0012814 | A1* | 1/2022 | Crabtree | G06Q 40/08 |
| 2022/0405739 | A1* | 12/2022 | Sindhu | G06Q 10/0635 |
| 2024/0354405 | A1* | 10/2024 | Oliver | G06F 21/554 |
| 2025/0159013 | A1* | 5/2025 | Leigh | H04L 63/1433 |

* cited by examiner

*Primary Examiner* — Ghazal B Shehni
(74) *Attorney, Agent, or Firm* — Finnegan, Henderson, Farabow, Garrett & Dunner, LLP

(57) ABSTRACT

Disclosed herein are methods and systems for improved service system configuration during distributed services execution by a distributed services system. In one example, different sets of machine learning models respectively generate signals indicative of predicted risk and expected values associated with execution of a service by the distributed services system. Next, expected values associated with actions, where each action corresponds to a configuration of the service, are determined so that an action that maximizes the expected value associated with the execution of the service based on the predicted risk can be selected. The action is then executed configuring the execution of the service for a user in the distributed services system.

11 Claims, 6 Drawing Sheets

CONFIGURING EXECUTION OF A SERVICE IN A DISTRIBUTED SERVICES SYSTEM

BACKGROUND

Modern distributed computing systems typically provide a number of services to their users, where each service may have its own execution. In such a distributed computing system, the services operate independently of one another, as well as interact with one another, to enable each of the various services offerings of the distributed computing system. The execution of the services may include real-time services, such as those executed in response to user requests, as well as periodic services, such as those executed on a quarterly, monthly, daily, etc. basis for users.

Each service's execution will typically include a risk of fraud or a risk of loss associated with the execution of the service. To combat the risk of fraud and/or risk of loss, the distributed computing system may perform fraud and loss detection processes on a current requested service operation or a periodic set of data associated with a service operation, and adjust or reconfigure the execution of the services accordingly. The analysis, however, may be incomplete by not considering additional factors associated with the service operations performed for a user. For example, a fraud or loss determination may result in a service configuration that, once applied, results in a negative impact on the execution of the service for the user. Such actions taken based on fraud or loss determinations, while accounting for the impacts on the distributed computing system, do not account for their impact(s) on the user system. Thus, relevant factors are typically not considered when deciding how to adjust or reconfigure the execution of the services of the distributed computing system for the users of the distributed computing system, leading to a suboptimal deployment and execution of the various services offerings of the distributed computing system, as well as a suboptimal experience for the users of the distributed computing system. Given the expansion and usage of such distributed computing systems, improved service system reconfiguration and execution is therefore a technical problem to be solved.

SUMMARY

Example methods are disclosed herein. An example method for configuring execution of a service in a distributed services system includes: receiving, by a computer system, a first set of signals generated by one or more first machine learning models, the first set of signals indicative of a predicted risk associated with the execution of the service for a user; receiving, by the computer system, a second set of signals generated by one or more second machine learning models, the second set of signals indicative of expected values associated with the execution of the service for the user; determining, by the computer system, a corresponding expected value associated with each of a plurality of actions, wherein each of the plurality of actions corresponds to a configuration of the service; selecting, by the computer system, an action from the plurality of actions that maximizes the expected value associated with the execution of the service based on the predicted risk; and executing, by the computer system, the action configuring the execution of the service for the user in the distributed services system.

Example systems that execute, and non-transitory machine-readable media having instructions stored thereon, which when executed by a computer system, causes the computer system to perform operations for, the above discussed method are also disclosed herein.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
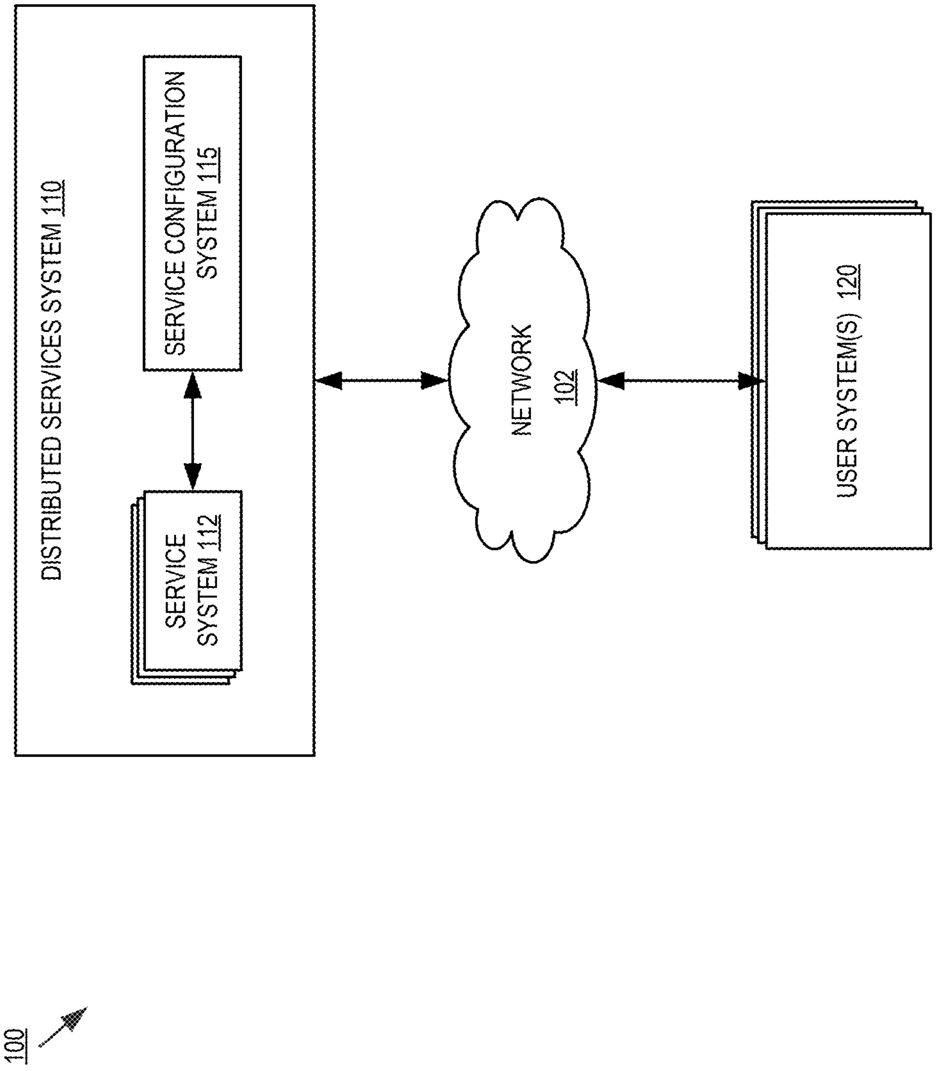
FIG. 1 is a block diagram of an exemplary system architecture of a distributed services system that configures execution of distributed services.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "selecting", "executing", "identifying", "performing", "monitoring", "detecting", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture of a distributed services system that configures execution of distributed services. In one embodiment, the system 100 includes distributed services system 110 and one or more user system(s) 120. In one embodiment, one or more of the user system(s) 120 may be computer systems, such as a desktop computer system, laptop computer system, server computer systems, etc. The distributed services system 110 may also be one or more computing devices, such as one or more server computer systems, desktop computer systems, etc.

The distributed services system 110 and user system(s) 120 may be coupled to a network 102 and communicate with one another using any of the standard protocols for the exchange of information, including secure communication protocols. In one embodiment, one or more of the distributed services system 110 and user system(s) 120 may run on one Local Area Network (LAN) and may be incorporated into the same physical or logical system, or different physical or logical systems. Alternatively, the distributed services system 110 and user system(s) 120 may reside on different LANs, wide area networks, cellular telephone networks, etc. that may be coupled together via the Internet but separated by firewalls, routers, and/or other network devices. In one embodiment, distributed services system 110 may reside on a single server, or be distributed among different servers, coupled to other devices via a public network (e.g., the Internet) or a private network (e.g., LAN). It should be noted that various other network configurations can be used including hosted configurations, distributed configurations, centralized configurations, etc.

In one embodiment, distributed services system 110 provides a plurality of services to user system(s) 120. Each of the services is executed by one or more service system(s) 112 of the distributed services system 110, such that one or more service systems 112 operate independently, in parallel, or collectively to provide a service to user system(s) 120. In one example, the service systems 112 provide financial processing services to one or more user system(s) 130. In some examples, distributed services system 110 may manage user system accounts held at the distributed services system 110, run financial transactions for user system(s) 120, clear transactions with third party systems (e.g., credit card systems, banking systems, payment service systems, etc., not shown), perform payouts to user system(s) 120 and/or agents of the user system(s) 120, manage transfers between accounts established for different user system(s) 120, perform tax tracking and regulatory compliance services for one or more of the user system(s) 120, as well as other services typically associated with distributed services systems. However, the embodiments discussed herein may be utilized by a plurality of different types of distributed services systems, such as card authorization systems, banks, and other systems. Furthermore, any distributed service system that offers services to its users, such as media distribution platforms, gaming platforms, software distribution systems, etc. may utilize the techniques discussed herein. However, to avoid obscuring the embodiments discussed herein, the configuration of services is discussed in terms of an example distributed services system to illustrate and describe the embodiments of the present invention, and is not intended to limit the application of the techniques described herein to other systems.

In embodiments, distributed services system 110 therefore includes a plurality of service systems 112 that independently or collaboratively provide the various services to user system(s) 120, as well as to other service system(s) 112. That is, each service system 112 may not only support the services offered to external systems (e.g., user system(s) 120), but may also aid and contribute to the execution of other service system(s) 112. Each of the service systems 112 is a distributed service system, such that one or more instances of each service system may be executed by distributed computing resources of the distributed services system 110.

In embodiments, prior to a service system 110 executing its respective services for a user system 120, a determination is made as to whether or not the service system 110 should perform the service. In some examples, the determination is a fraud determination, a credit loss determination, or other determination, which are referred to herein as risk determinations. Furthermore, in some examples, the determination may be performed in real time in response to a user request 120 to a service system 112 to perform a service operation. One example of such a service request with a real time determination is a service request made to a transaction processing service system that receives the request to process a transaction and attributes associated with the transaction (e.g., user, card number, amount, transaction origin, transfer destination, email address, originating merchant, internet protocol address, etc.). The factors may then be used, for example by one or more trained machine learning model(s), to detect whether the requested transaction is fraudulent (e.g., involves a fraudulent business, is part of a card cashing scheme, is part of a card testing attack, is a transaction using a stolen card, etc.). Another example is a service offering used by other services of the distributed services system 110, and a periodic (e.g., weekly, daily, hourly, etc.) determination as to whether or not credit should be extended to a user system 120 for other services performed for the user system 120. Credit, in this example, is a risk of loss extended by the distributed service system 110 that, for example, allows a service system 112 to perform a payout to a user system 120 prior to a transaction clearing with a banking system or card network system. The payout is seen as credit extended to the user system 120, as the payout may be made prior to transaction clearing, and the distributed services system 110 bears the risk of loss if the card network system or the banking system ultimately holds the company responsible for non-delivery of the good or service associated with the transaction. In this example, attributes associated with the user system 120 (e.g., history of transactions, clearance records, type of business involved, geographic region, etc.) are used to make a machine learning based periodic determination of whether or not to extend credit to a user system 120 and/or how much credit can be offered.

Such example determinations, as to whether or not fraud is detected or how a risk of loss should be handled, would typically be treated as the sole factor in determining whether or not to allow a service system 112 to perform its respective service. However, denying or altering a service execution on the fraud and/or risk of loss determinations discussed above, do not account for the value a user system 120 brings to the distributed services system 110, and therefore results in suboptimal execution of the service system 112 when providing services to the user system(s) 120, as well as a suboptimal user experience provided to the user system(s) 120.

In embodiments, as discussed in greater detail herein, the risk determinations discussed above are treated as generating risk signals for determining how to configure a service system 112 for a user system 120. Furthermore, in embodiments, value signals are further generated by service configuration system 115 prior to taking any actions by a service system 112, where such value signals represent a value that a user system's 120 use of a service system 112, or the user system's 120 interactions with the distribute services system 110 as a whole, brings to the distributed service system 110.

For example, a first user system may be a long-time user of the distributed service system 110, which accesses a large number of high value service system 112 operations a day, whereas a second user system may be a new user of the distributed service system 110, which only requests one or two low value service system 112 operations a day. Given the different qualities of the example user systems, how the service systems 112 are configured to process respective user system service requests for each user system may be different. That is, if the same type of fraud is predicted for each of the first user system and the second user system for a similar type of requested transaction, it may be determined by the service configuration system 115 that the requested transaction of the first user system should be allowed to proceed whereas the requested transaction of the second user system should be rejected. This is because the value each user system provides to the distributed service system 110 is different. Put another way, if the value each user system provides is compared to the detected risk of fraud, the amount of risk of fraud the distributed services system 110 is willing to accept with respect to each user system may be different. For example, disrupting operations of a long-time user system may be undesirable to avoid harming a user system experience in a specific instance, and thus avoid harm done to the user system's perception of the distributed services system 110. Similarly, a new user who requests a relatively small amount of service system operations, may not experience the same disruption in services, and/or a value loss if the new user leaves the distributed service system 110 would be minimal.

In embodiments, service configuration system 115 therefore receives risk signals (e.g., in real time or periodically) for services to be provided to a user system 120 by a service system 112, and further receives value signals associated with the value a user system 120 brings to the distributed services system 110. As will be discussed in greater detail herein, the risk signals and the value signals are used to generate expected values associated with a number of different service system configurations. For example, expected values associated with not reconfiguring a service system, expected values associated with requiring a user system to place a reserve or other deposit prior to a service system executing its service, expected values associated with rejecting a user system access to a service (e.g., rejecting a transaction, not extending or reducing credit, etc.), as well as expected values associated with other service system configurations. Then, in embodiments, the expected values can be compared and a configuration of the service system's 112 operation selected for the user system 112 that maximizes the expected value among the configuration options. Service configuration system 115, as discussed herein, therefore selects a configuration that accounts for the variety of risks (e.g. fraudulent business risk, card cashing scheme risk, credit loss risk, financial crime risk, etc.) to the distributed services system 110, value of a user system with respect to different configurations, and user experience with the service system execution. The service configuration system's 115 selection ensures a more optimal configuration of a service system, and thus a more optimal experience for a user system when using the services of the distributed service system 110, as well as a more optimal service system configuration and execution by the distributed services system 110.

Furthermore, in some embodiments, a risk value may also be used to adjust the risk signals within the expected value determinations. For example, a risk value may be determined for a user system, or a population of user systems sharing one or more common traits, that weighs or adjusts the risk signals up or down based on how risky that user and/or population is considered. The setting of the risk value may be by an operator of the distributed service system 110, or programmatically in response to a testing of risk values, as discussed below. In either embodiment, the use of a risk value in adjusting risk signals weight in the expected values determinations enables a more fine-tuned and customized accounting for risk in service system configuration and execution, therefore resulting in more optimal service system configuration and execution, and configurability that is tunable to individual user systems or different segments of user systems.

For example, and as discussed in greater detail below in FIGS. 2 and 3, service configuration system 115 employs a service system configuration selection logic that receives risk signals (e.g., probability of default and/or fraud) and value signals (net revenue over a period of time, and risk of churn being a prediction a user system will stop a service in response to a specific configuration change) from different sets of independent machine learning models, and perform service system configuration selection based on:

select (max of):

(a) expected_value(no configuration change|risk value) = user_value (no configuration change) −

-continued $$\text{(losses(no configuration change)/risk value)},$$

$$\text{(b) expected\_value(reserve|risk value)} = \text{user\_value (reserve)} - \text{(losses(reserve)/risk value)},$$

$$\text{(c) expected\_value(reject|risk value)} = \text{user\_value (reject)} - \text{(losses(reject)/risk value)},$$

$$\ldots$$

$$\text{(n) expected value(configuration\_x|risk value)} = \text{user\_value } (x) - \text{(losses}(x)\text{/risk value)}.$$

In the embodiment, the selection of configurations of a service system is between configurations that do not change the current configuration, require a deposit or reserve in order for the service system to execute a requested service system operation, reject a user system's requested operation, as well as other configurations. Furthermore, the selection is performed to select a configuration having a maximum expected value, which ensures a best decision is made for both the user system (e.g., continued operation consistent with the user systems detected risk and value signals), and the distributed service system (e.g., continued operation with maximum value that accounts for the detected risk of loss, avoids churn of user systems causing the user systems to stop use of the service system(s), and ensures value of user systems and/or segments of user systems are accounted for).

Figure 2:
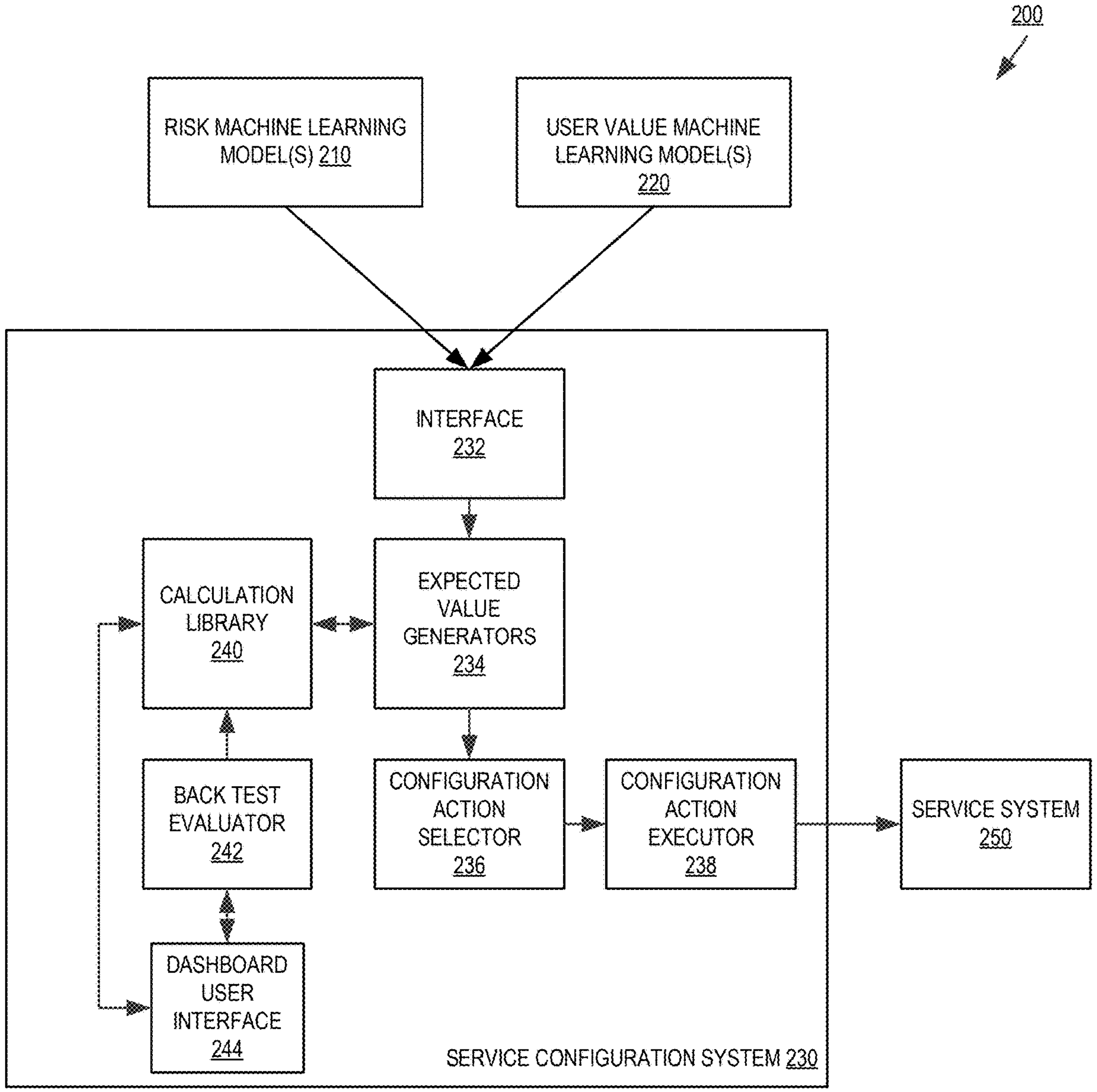
FIG. 2 illustrates a block diagram of one embodiment of service configuration system architecture deployed by the distributed services system.

FIG. 2 illustrates a block diagram of one embodiment of service configuration system architecture 200 deployed by the distributed services system. The service configuration system architecture 200 provides additional details for the service configuration system 115 discussed above in FIG. 1.

The service configuration system architecture 200 includes a number of systems, the operations of which are discussed in greater detail below. Each of the plurality of systems are executable on distributed processing resources of a distributed services system (e.g., distributed services system 110), and represent instances of each such system. Thus, in some examples, one or more of the plurality of systems may spawn new instance(s) to account for increased system load and/or take down instance(s) in response to decreased system load. Therefore, the operations discussed below are those of a given instance of the corresponding systems, and are responsive to the volume and load of a modern distributed service system.

Service configuration system 230 is responsible for determining how to configure a service system 250 (e.g., one of service systems 112), and executing the configuration on the service system 250. In order to make such a determination, interface 232 of service configuration system 230 receives risk signals from risk machine learning model(s) 210 and also receives user value signals from user value machine learning model(s) 220. In embodiments, interface 232 is an application programming point (API) endpoint exposed on a network to which service configuration system 230 is deployed. Furthermore, the API endpoint may receive the risk signals and user value signals in response to a request of a user system (not shown) for an operation to be performed by service system 250. In other embodiments, interface 232 pulls one or more of the risk signals and/or user value signals when generating a service system configuration selection.

In either embodiment, the risk machine learning model(s) 210 are a set of trained machine learning models, such as one or more tree-based models, support vector machines, deep neural networks, ensemble models, etc. that are trained to detect transaction and/or credit risk associated with a user system. The risk machine learning model(s) 210 include models trained to predict probabilities for credit accounts receivable, expected credit loss, whether a business or payment instrument is fraudulent, whether a card-based attack is occurring, whether a card is stolen or spoofed, as well as other fraud and loss based risk detection models. In embodiments, annotated historical data may be fed into each risk machine learning model in an iterative training process, to train each risk machine learning model, and once trained each model is enabled to generate a predicted likelihood of fraud and/or credit default based on model inputs. Furthermore, in embodiments, expected credit loss model(s) and expected fraud loss model(s) of the risk machine learning model(s) 210 are further trained, using annotated historical data, based on actions taken against user systems (e.g., doing nothing, requiring a reserve, rejecting a service offering, etc.) to enable the risk machine learning model(s) to predict an impact of a predicted loss in view of a potentially selected action. The training may be performed periodically with new and/or newly annotated training data to ensure each risk machine learning model(s) can predict fraud and/or credit risks in view of current trends, attack vectors, different actions, etc. Then, during production and use by the service configuration system 230, each risk machine learning model 210 may operate in real-time mode in response to real time service system requests, or in batch mode in response to periodic service system configuration performance (e.g., configuration determination and execution on a weekly, daily, hourly, etc. basis), upon input signals (e.g., transaction signals or collected user system signals). Each risk machine learning model 210 outputs respective risk signals to interface 232, where each risk signal is indicative of a predicted risk of loss of a type corresponding to the model generating the predicted risk, and in some embodiments based on an action which can be used to configure a service or service system. For example, a prediction output by a card cashing detection machine learning model would include a probability or prediction indicative of a risk that a user's account demonstrates a card cashing scheme or is not demonstrating card cashing scheme for one or more transactions. As another example, a prediction output of a credit risk machine learning model would include a probability indicative of a risk that predicted accounts receivable will not be sufficient to cover credit extended to a user system. The risk signals are collectively transmitted or provided to interface 232.

The user value machine learning model(s) 220 are also a set of trained machine learning models, such as one or more tree-based models, support vector machines, deep neural networks, ensemble models, etc. that are trained to predict signals indicative of user value to a distributed services system. User value signals may be predicted based on, for example, the past transaction payment volume a user has had over their lifetime, the predicted future profitability of keeping that user on the user system, a brand value of having a particular user system as a user of the distributed service system, as well as other ways to predict user value to a distributed services system. FIG. 3 provides additional details of the user value machine learning model(s) 222.

Figure 3:
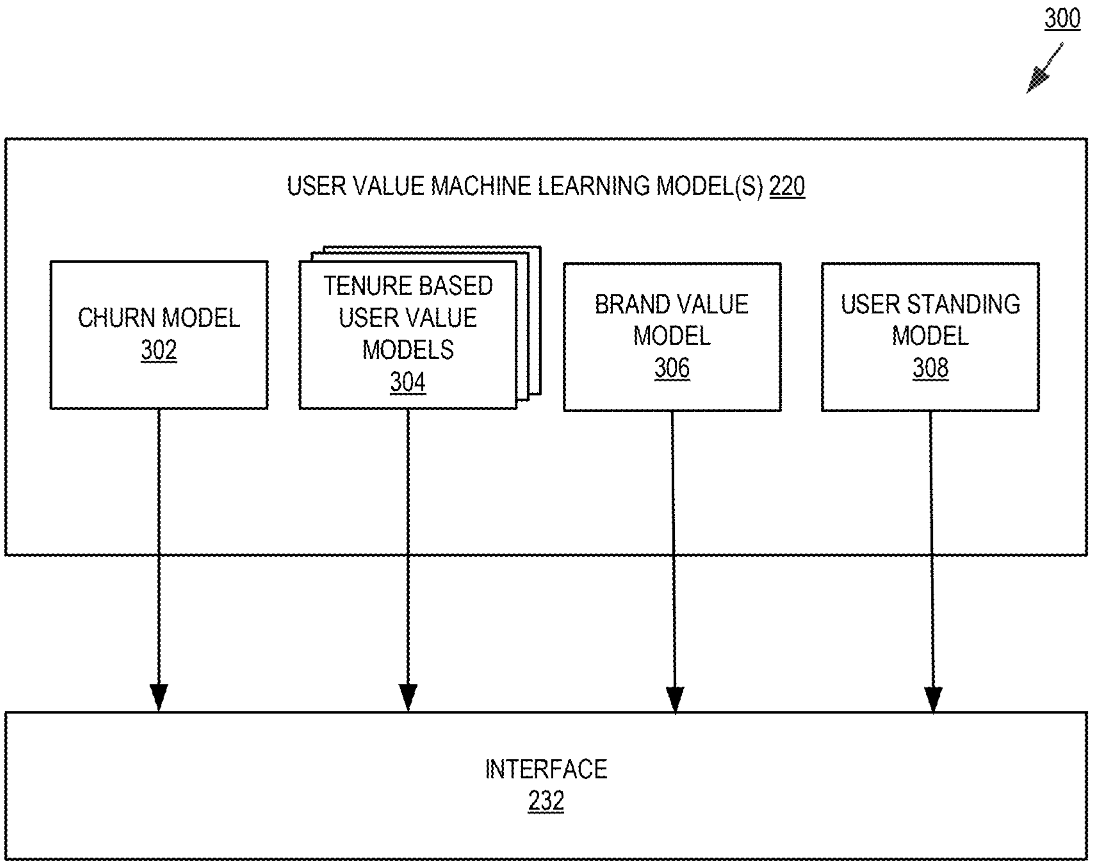
FIG. 3 illustrates a block diagram of user value machine learning model(s) of the service configuration system.

With reference to FIG. 3, user value machine learning model(s) 220 includes a set of trained tenure based user value model(s) 304. Each tenure based user value model 304 is trained to generate user value signals indicating a predicted value a user system brings to the distributed service system 110. The models 304 are tenure based, and are therefore selectively applied to a given user system according to their tenure. Tenure, as discussed herein, can include a length of time a user system as interacted with the distributed service system, a number of requests made to the distributed service system, an overall amount processed by the distributed service system on behalf of a user system, or some other indicator of how long a user system has used services of a distributed service system. Tenure is important because machine learning model predictions of longer tenured users (e.g., 1+ year tenure, >X transactions, etc.) may be able to generate more stable and reliable predictions, whereas shorter tenure users (e.g., <1 year years, less than Y transactions, etc.) may have more fluctuating behavior that is more challenging to predict. In embodiments, the tenure based user value models 304 are each revenue forecasting models, for example the profit forecasting models with or without seasonality. In embodiments, the user value models 304 may include other models capable of predicting various forms of user value with respect to a distributed service system. Thus, by separating and training different and independent user value models for users of different tenures, more accurate user value predictions, and thus resulting configuration selection and execution, occur.

User value machine learning model(s) 220 further includes a user experience model, illustrated as the churn model 302. The churn model 302 is a machine learning model trained to predict a likelihood of a poor user system experience if one a range of actions is taken to configure a service system. As discussed herein, those actions can include no action where an existing configuration is maintained, a reject action in which a transaction or credit offering is rejected, a reserve action in which a user system is required to place a deposit for services to be provided by a service system, a biometric action in which a user is asked to take a photo of themselves to verify their identity, as well as many other actions. As discussed herein, historical data may be used to train and/or periodically retrain the churn model 302 to predict user experience, where such output is a predicted likelihood that a given action will result in user churn (e.g., a predicted probability of a user system stopping usage of a service or the distributed services system if the corresponding action is taken).

User value machine learning model(s) 220 further includes models that account for additional types of value associated with users systems, and are illustrated as brand model 306 and user standing model 308. The brand model 306 is a model trained to predict a value amount added to the distributed service system that results from a usage of the distributed service system by a particular user system. For example, usage by the distributed service system by established users, users with positive social standing or perception, users in certain industries, etc. may indicate to other users that the distributed service system should also and therefore add value to the distributed service system beyond a monetary value of the user system. Training this model may include, for example, training data before and after certain users join and/or leave the distributed service system, how actions taken on such users impact the user system's usage of the distributed services system, etc.

The user standing model 308 is also a model that predicts a value beyond a monetary value of a user system. That is, the user standing model 308 is trained to predict a value that accounts for a user system's standing with the distributed service system. The model may be trained, for example, on historical data and/or user features, such as length of time a user system has used services of the distributed service system, data indicative of a user system's good standing (e.g., current on obligations, timely payments, etc.) with the distributed services system. In embodiments, the user standing model 308 predicts a user value attributable to their good standing that ensures user value predicted for each user system that is in good standing is not solely based on potential monetary value of that user system (e.g., based only on how much revenue a user system is predicted to generate).

The tenure based user value models 304, the churn model 302, the brand value model 306, and the user standing model 308 collectively generate a set of user value signals that have predicted values indicative of user value. Furthermore, by incorporating brand value model 306 and user standing model 308, the use value associated with the set of user value signals accounts for user monetary value, user experience, and non-monetary value a user brings to the distributed services system. Thus, rather than basing a service system configuration solely on risk of loss predictions, the service system configuration system 230 is further able to account for the user system to which a configuration of a service system's execution will be applied, and even ensure user systems in good standing also benefit from improved service system configuration, even when such systems might be forecasted to provide low revenue by the user value model(s) 304. This leads to better user and distributed service system experiences, as well as more consistent usage of a service system by a user system.

Returning to FIG. 2, interface 232 supplies the risk signals and user value signals to expected value generators 234. Expected value generators 234 are responsible for processing the risk signals and user value signals into expected values in a way in which configuration action selector 236 can apply a configuration selection logic, as discussed herein. In embodiments, expected values generators 234 are responsible for generating expected values of different configuration options given user value values and expected loss values. In an embodiment, the configurations include doing nothing and maintaining a current configuration, requiring a reserve in order for a service system to process user system requests, and rejecting a user system transaction and/or credit, although additional service and service system configurations could be used consistent with the discussion herein.

Initially, the expected value generators 234 obtain a risk value from calculation library 240. The risk value, as discussed herein, is a configurable value that modifies expected loss and expected user value thereby influencing when a configuration is selected and which configuration is selected. In some embodiments, the risk value is set by an operator via dashboard user interface 244. In other embodiments, a risk value may be programmatically set through back test evaluator 242, discussed below.

Expected value generators 234 then utilize the received user and loss values, received as signals generated for a user or segment of users by risk machine learning model(s) 210 and user value machine learning model(s) 220 expected values, to generate a set of expected values associated with different potential configuration actions. For example, in some embodiments, the expected value generators 234 generates an expected value for a user when there is no configuration change to a service system used by that user, such as computing expected_value(no configuration change|risk value)=user_value (no configuration change)−(losses(no configuration change)/risk value). The predicted expected value of no configuration change uses signals from the risk machine learning model(s) 210, such as signals indicative of a predicted amount of loss if there is no configuration change to a service system divided by the set risk value (e.g., losses(no configuration change)/risk value), as well as user value signals such as a predicted value brought from a user's use of a service system if there is no configuration change (e.g., user_value (no configuration change)). Then, the expected value generators 234 can use the signals to compute expected_value(no configuration change|risk value)=user_value (no configuration change)−(losses(no configuration change)/risk value).

Similarly, and in embodiments, the expected value generators 234 generate an expected value for a user when a reserve is required before a service or service system can be used by that user, such as expected_value(reserve|risk value)=user_value (reserve)−(losses(reserve)/risk value). The reserve, in embodiments, may be a deposit in a set amount that is reserved to satisfy potential losses if a user defaults (e.g., fails to satisfy an obligation), and the value and risk signals may be generated by the respective machine learning models based at least in part on the reserve amount. The predicted expected value when a reserve is required uses additional signals from the risk machine learning model(s) 210, such as signals indicative of a predicted loss if a reserve is required (e.g., a machine learning model indicative of potential churn associated with a user in the event of a reserve requirement, a reduced use of a service, etc., as predicted by the risk MLMs 210) and divided by the risk value (e.g., losses(reserve)/risk value), as well as user value signals such as a predicted value brought from a user's use of a service system in the event the reserve requirement is implemented (e.g., user_value (reserve)). Then, the expected value generators 234 can use the signals to compute expected_value(reserve|risk value)=user_value(reserve)−(losses(reserve)/risk value).

Additionally, and in embodiments, the expected value generators 234 also generates an expected value for a user when a request to use a service of a service system is rejected, such as expected_value(reject|risk value)=user_value(reject)−(losses(reject)/risk value). The rejection, in embodiments, may be a real-time rejection of a requested transaction (e.g., a decline of a risky transaction), or a rejection to access a service (e.g., rejection of a request to process card based transactions). The predicted expected value when determining to reject a service request uses additional signals from the risk machine learning model(s) 210, such as signals indicative of a predicted loss if the service request is rejected (e.g., a machine learning model indicative of potential churn associated with a user in the event the service request is rejected, a reduced use of a service, etc., as predicted by the risk MLMs 210) divided by the risk value (e.g., losses(reject)/risk value), as well as user value signals such as a predicted value brought from a user's use of a service system in the event the service system rejection is implemented (e.g., user_value (reject)). Then, the expected value generators 234 can use the signals to compute expected_value(reject|risk value)=user_value (reject)−(losses(reject)/risk value).

In embodiments, although certain example configuration options are discussed above, expected values may be generated for additional configurations consistent with the discussion herein. For example, the expected value generators may generate expected values, expected_value(biometric scan|risk value)=user_value (biometric scan)−(losses(biometric scan)/risk value), for obtaining a biometric verification as a condition for using a service. Furthermore, the expected values may further be adjusted in additional scenarios, such as when reserves include expiring reserves (e.g., funds released to a user system at a certain time). When a reserve is about to expire, such as expiration with a threshold amount of time, the no configuration change expected values may be adjusted in view of the release of the reserve funds.

Expected value generators 234 then provide the resulting expected values, generated as discussed above, to configuration action selector 236. As discussed herein, configuration action selector 236 includes a selection logic that implements:

$$
\begin{aligned}
&\text{select (max of):}\\
&\text{(a) expected\_value(no configuration change}|\text{risk value)} = \\
&\qquad \text{user\_value (no configuration change)} - \\
&\qquad \big(\text{losses(no configuration change)/risk value}\big),\\
&\text{(b) expected\_value(reserve}|\text{risk value)} = \\
&\qquad \text{user\_value (reserve)} - \big(\text{losses(reserve)/risk value}\big),\\
&\text{(c) expected\_value(reject}|\text{risk value)} = \\
&\qquad \text{user\_value (reject)} - \big(\text{losses(reject)/risk value}\big),\\
&\qquad \ldots\\
&\text{(n) expected value(configuration\_x}|\text{risk value)} = \\
&\qquad \text{user\_value } (x) - \big(\text{losses}(x)\text{/risk value}\big).
\end{aligned}
$$

The selection, performed by configuration action selector 236, which uses the expected values generated by expected value generators 234, seeks to maximize the value to the distributed service system while at the same time accounting for user experience of a resulting configuration. As a result, a more optimal service system configuration for all parties can be selected.

The selected configuration is then provided from configuration action selector 236 to configuration action executor 238. Configuration action executor 238 is responsible for deploying the configuration adjusting the operation of service system 250 for a user. Thus, the service configuration system 230 forms a type of feedback system that enables real-time and/or batch service system configurations to be analyzed, selected, and applied to configure the execution of service system 250.

Furthermore, in some embodiments, certain assumptions of a configuration, such as a risk value may be set and tested, or programmatically set, prior to deployment to calculation library 240 and expected value generators 234. In an embodiment, dashboard user interface 244 is responsible for generating a graphical user interface of the expected value calculations for different users and/or service systems, with the current set of risk values. Thus, an operator is able to view how configuration decisions are being made, what the values calculated for a user, segment, and/or service are, the configuration selection impact of currently selected risk values to users and/or segments of users, and then how the application of a service system configuration is received. In some embodiments, an adjustment to the risk value for a given user and/or population/segment of users (e.g., users in an industry segment, users in a geographic location, users of a certain tenure, etc., as well as a combination of two or more user population characteristics) may be set by an operator via dashboard user interface 244. In embodiments, prior to deployment of the risk value, back test evaluator 242 may pass the test risk value to calculation library for running a test against historical service system processing data, which recomputes configuration selections and resulting values, and compares the operation results of the new/test risk value against a prior/production risk value. This enables the operator to determine if a new risk value outperforms a prior risk value, underperforms the prior risk value, or is equivalent. Furthermore, a range of risk values may be selected automatically, by the back test evaluator 242 or operator, and tested to automatically determine a risk value that provides a returned maximum value to the distributed services system for a given user system or population of user systems.

Therefore, in embodiments, back testing enables operators to personalize and tailor risk values to weight service system configurations. Such customization is useful in dynamic industry settings where risk and/or values swing significantly, during economic downturns, or other conditions, such as fraud attacks originating from a particular region or using certain payment methods, that impact all or a subset of users. Therefore, in embodiments, risk values may be set and/or tested in response to emerging risk, fraud, or loss patterns (e.g., fraud originating from a specific country, related to a specific user system, occurring in a specific industry, etc.), to improve system configurations in response to such scenarios.

Figure 4:
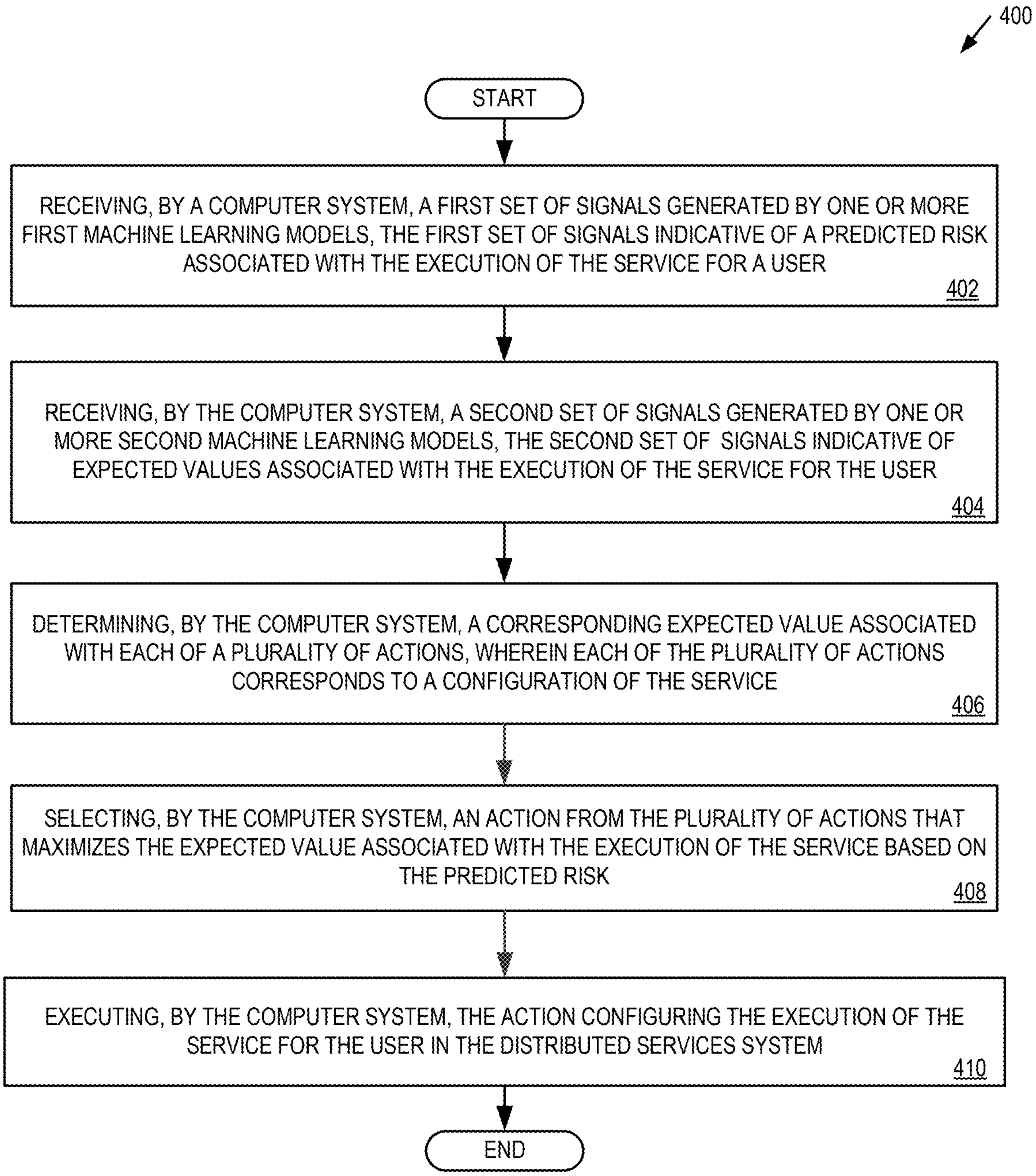
FIG. 4 illustrates a flow diagram of one embodiment of a process for determining and executing service system configuration in a distributed services system.

FIG. 4 illustrates a flow diagram of one embodiment of a process 400 for determining and executing service system configuration in a distributed services system. The process is performed by processing logic that may comprise hardware (circuitry, dedicated logic, etc.), software (such as is run on a general-purpose computer system or a dedicated machine), firmware, or a combination. In one embodiment, the process is performed by a service configuration system (e.g., service configuration system 115 or 230).

The process begins by receiving, by a computer system, a first set of signals generated by one or more first machine learning models, the first set of signals indicative of a predicted risk associated with the execution of the service for a user (processing block 402). As discussed herein, the first set of machine learning models are risk models trained to determine, for example, a predicted risk of transaction fraud, whether a transaction is part of an attack (card testing, card cashing, etc.), whether a user is actually a fraudster, a predicted risk of default, as well as additional risk signals such as those discussed above with respect to the expected value generators 234 usage of risk signals. Furthermore, the predictions may be generated in real-time in response to a service system request received by a user system. In other embodiments, the predictions are generated from batch data periodically, such as monthly, weekly, daily, hourly, etc.

Processing logic receives, by the computer system, a second set of signals generated by one or more second machine learning models, the second set of signals indicative of expected values associated with the execution of the service for the user (processing block 404). The second set of machine learning models are models trained to generate user value signals, such as, predicted operating net revenue, which may or may not be tenure based, probability of user system churn associated with a given action, as well as additional user value signals such as those discussed above with respect to the expected value generators 234 usage of user value signals.

Processing logic then determines, by the computer system, a corresponding expected value associated with each of a plurality of actions, wherein each of the plurality of actions corresponds to a configuration of the service (processing block 406). In embodiments, the first set of signals are predicted risk of loss signals associated with potential service system configurations, and the second set of signals are user value and user experience signals associated with potential service system configurations. Thus, the collection of signals are used to generate expected values associated with given actions, where the generated expected values are able to account for a variety of factors, including a variety of user values and loss or risk associated with a given action. Embodiments of accounting for user value and risk of loss are discussed above. Furthermore, as discussed herein, the actions for configuring a service system include, but are not limited to, doing nothing and keeping a current configuration, rejecting a service system request or operation, requiring biometric verification, and requiring a user reserve before service system execution. Each of the aforementioned actions can be used to configure operation of a service system for a user system.

Processing logic selects, by the computer system, an action from the plurality of actions that maximizes the expected value associated with the execution of the service based on the predicted risk (processing block 408). That is, processing logic, in using the predicted expected user value of a given action and a predicted expected risk of loss of that given action, is able to determine and select among a plurality of actions, which action and thus service system configuration obtains the best result for both a user (e.g., user value) and the distributed services system (e.g., predicted loss), while also accounting for user experience. By taking user value, user experience, and risk of loss into account, processing logic is able to make an improved selection for configuring operation of a service system for a user system or segment of user systems. Embodiments of the equations and selection performed by processing logic are discussed above in greater detail with respect to FIGS. 1 and 2.

Processing logic executes, by the computer system, the action configuring the execution of the service for the user in the distributed services system (processing block 410). By executing the action, processing logic implements the selected configuration to adjust and maximize the service system operation within the distributed service system for both the distributed services system and the user system using the service system.

Figure 5:
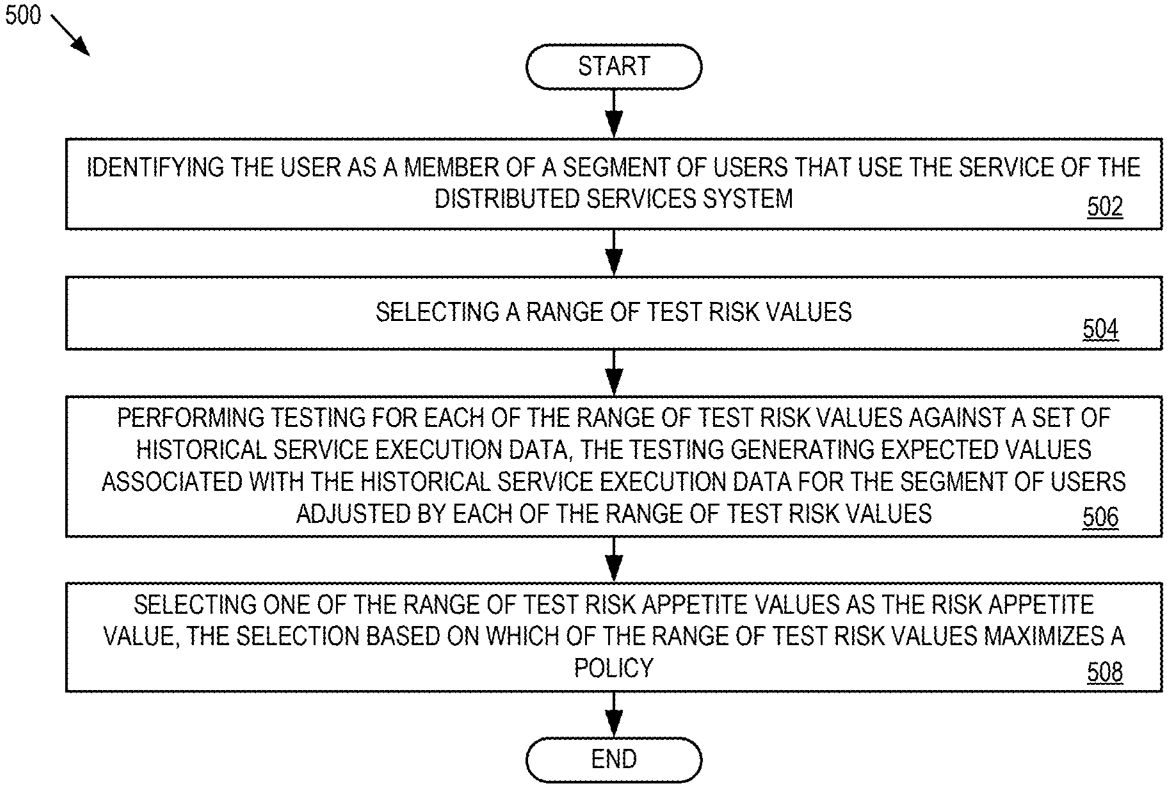
FIG. 5 illustrates a flow diagram of one embodiment of a process for testing and selecting risk values used for configuring execution of services in the distributed services system.

FIG. 5 illustrates a flow diagram of one embodiment of a process 500 for testing and selecting risk values used for configuring execution of services in the distributed services system. The process is performed by processing logic that may comprise hardware (circuitry, dedicated logic, etc.), software (such as is run on a general-purpose computer system or a dedicated machine), firmware, or a combination. In one embodiment, the process is performed by a service configuration system (e.g., service configuration system 115 or 230).

The process begins by identifying the user as a member of a segment of users that use the service of the distributed services system (processing block 502). In embodiments, segments of users are users having one or more shared characteristics, such as length of tenure with a distributed service system, geographic origin, industry, etc. Thus, as discussed herein, a same service system configuration can be applied to a logical group of users sharing one or more relevant characteristics. For example, long tenured commercial construction user systems likely have different service system risk and needs than do mid tenured retail sales user systems. Thus, the ability to identify and segment user system groups enables testing and configuration applied to these specific groups.

Processing logic selects a range of test risk values (processing block 504). In some embodiments, risk values weight or adjust how expected user values and expected risk are calculated in the above discussed equations and configuration selection techniques. Put another way, the risk value is able to define the importance risk and user value have, and thus weights both in the selection process. Furthermore, the range of test risk values provide for improved explainability in how the different risk values will impact service system configurations, and the resulting user values and losses determined for the range of different risk values.

Processing logic performs testing for each of the range of test risk values against a set of historical service execution data, the testing generating expected values associated with the historical service execution data for the segment of users adjusted by each of the range of test risk values (processing block 506). The testing is pre-deployment testing of the test risk values, and uses historical data (e.g., service system requests, transactions, users, operations, values, etc.) to obtain an accurate depiction or prediction of how each of the range of test risk values would have performed if deployed for service system configuration, how each would change value to the distributed service system for given risk values, and how each would impact user experience. Thus, a clear picture of the range of test risk values is generated through backtesting prior to deployment, which beneficially enables testing and confidence in selected test risk values.

Processing logic selects one of the range of test risk values as the risk value, the selection based on which of the range of test risk values maximizes a policy (processing block 508). In embodiments, the selection is policy based to maintain a set relationship between value obtained by a distributed service system against changes to user experience. For example, a risk value that ensures maximum benefit to a distributed services system, but which causes a user experience resulting in high churn, is not ideal. Thus, in some embodiments, the policy can include one or more threshold values indicating an acceptable resulting expected user value and risk combination. In other embodiments, the policy may define values relative to a prior deployment of a risk value. For example, a policy may define that a risk value which decreases risk while not decreasing user value should be accepted. As another example, a policy may be defined such that a risk value that increases user value but does not decrease risk by more than x % should be accepted. The selected risk value may then be deployed to actively configure service systems for users of a distributed service system, consistent with the discussion herein.

Figure 6:
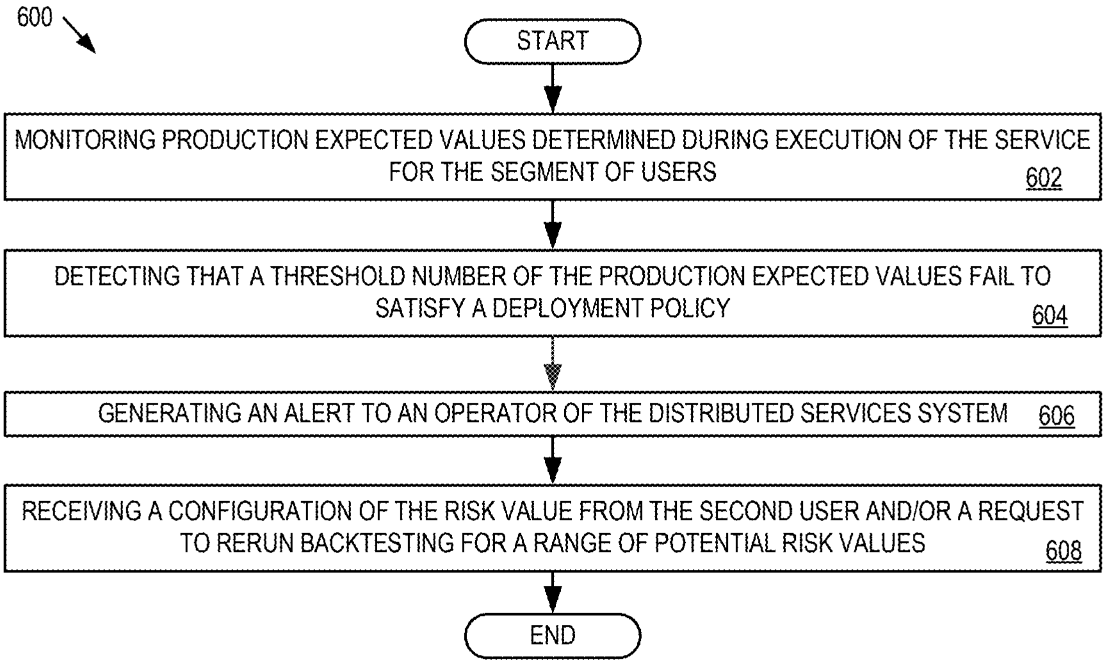
FIG. 6 illustrates a flow diagram of one embodiment of a process for monitoring and alert generation when production risk values fail to satisfy a policy.

FIG. 6 illustrates a flow diagram of one embodiment of a process 600 for monitoring and alert generation when production risk values fail to satisfy a policy. The process is performed by processing logic that may comprise hardware (circuitry, dedicated logic, etc.), software (such as is run on a general-purpose computer system or a dedicated machine), firmware, or a combination. In one embodiment, the process is performed by a service configuration system (e.g., service configuration system 115 or 230).

The process begins with processing logic monitoring production expected values determined during execution of the service for the segment of users (process block 602). As discussed herein, the expected values are user values associated with user value added to a distributed services system by execution of a service system for one or more user systems having a given configuration, as well as risk of loss values associated with predicted risk of loss resulting from the execution of the service system with the given configuration. Furthermore, the expected values are those generated during production (e.g., application of a configuration and/or risk value to a service system for a given user or segment of users).

Processing logic detects that a threshold number of the production expected values fail to satisfy a deployment policy (processing block 604). In embodiments, the deployment policy may be a policy defined by a relationship between user value and risk expected values (e.g., risk of loss<user value), may be a policy defined based on direction of rate of change (e.g., risk of loss increasing to X, user value decreasing at Y over a period of time t), or other policies. Thus, when a threshold number of expected values fail one or more policies, the result is indicative of operation inconsistent with the operating goals of a distributed service system.

Processing logic therefore generates an alert to an operator of the distributed services system (processing block 606). In embodiments, the operator is an engineer, risk expert, user value expert, strategist, or other distributed services system user that is responsible for setting and/or reviewing risk values and resulting expected value calculations, as discussed above. The alert is therefore generated to inform the operator of a developing or existing condition in which service system execution is failing to meet one or more policies, and thus is not operating in a desired way.

Processing logic receives a configuration of the risk value from the second user and/or a request to rerun backtesting for a range of potential risk values (processing block 608). Processing logic receives the risk value and/or backtesting request for programmatic risk value selection (e.g., run FIG. 5) to alter the operation of the service configuration system. Thus, the alerting and resetting of the risk value when policy violations above a threshold amount are occurring, enables the early detection that service system operation is not performing in an optimal fashion, and further minimizes loss due to lack of optimal service system configuration by enabling testing and resetting of an improved risk value.

Figure 7:
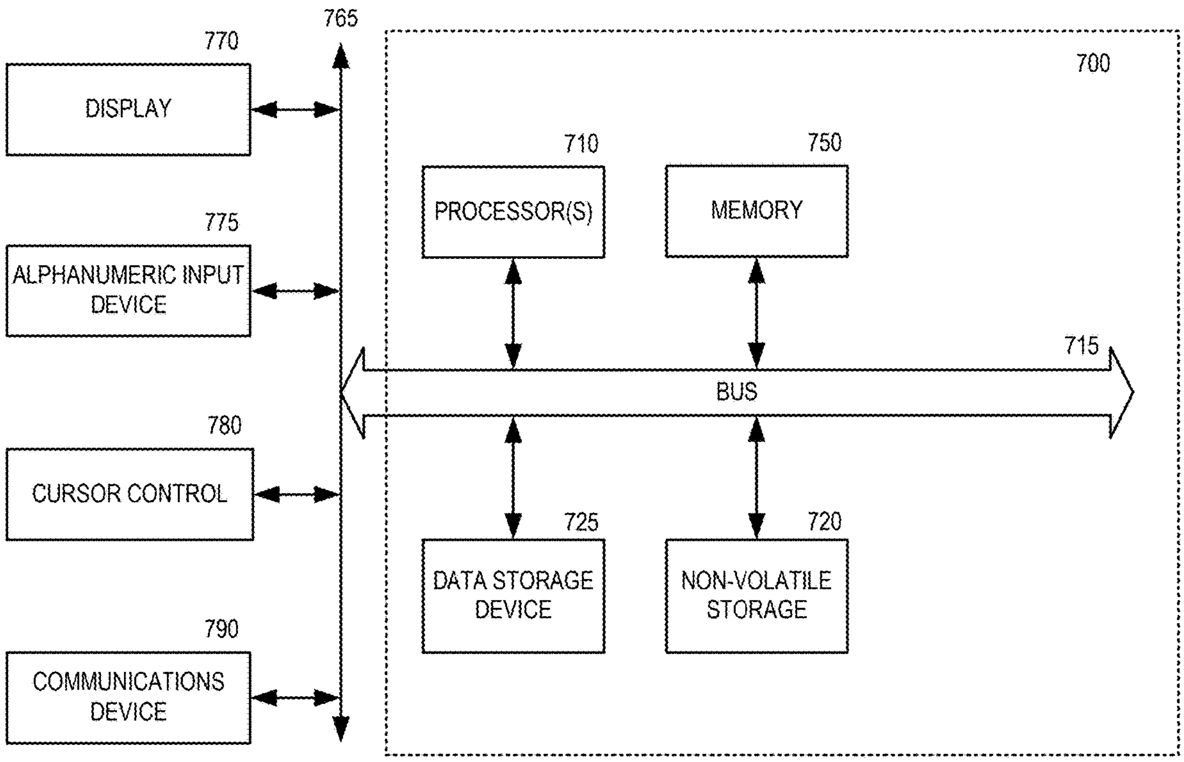
FIG. 7 is one embodiment of a computer system that may be used to support the systems and operations discussed herein.

FIG. 7 is one embodiment of a computer system that may be used to support the systems and operations discussed herein. In some examples, the computer system illustrated in FIG. 7 may be used by a distributed service system, a user system, etc. It will be apparent to those of ordinary skill in the art, however that other alternative systems of various system architectures may also be used.

The data processing system illustrated in FIG. 7 includes a bus or other internal communication means 715 for communicating information, and one or more processor(s) 710 coupled to the bus 715 for processing information. The system further comprises a random access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a light emitting diode (LED) display or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a touchpad, mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The embodiments discussed herein may also be embodied in a handheld or portable device containing a subset of the computer hardware components described above. In some examples, the handheld device may be configured to contain only the bus 715, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. In some examples, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purposes of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method for configuring execution of a service in a distributed services system, the method comprising:

receiving, by a computer system, a first set of signals generated by one or more first machine learning models, the first set of signals indicative of a predicted risk associated with the execution of the service for a user;

receiving, by the computer system, a second set of signals generated by one or more second machine learning models, the second set of signals indicative of expected values associated with the execution of the service for the user;

determining, by the computer system, a risk value, the risk value indicative of an amount of risk associated with the user, a segment of users associated with the user, or the service to be executed for the user, by:

identifying, by the computer system, the user as a member of the segment of users that use the service of the distributed services system;

selecting, by the computer system, a test risk value;

testing, by the computer system, against a set of historical service execution data, the test risk value by generating test expected values from the historical service execution data for the segment of users adjusted by the test risk value; and when the test expected values adjusted by the test risk value satisfy a policy, setting a value of the risk value with the test risk value;

subsequent to determining the risk value, adjusting, by the computer system, the predicted risk by the risk value;

determining, by the computer system, a corresponding expected value associated with each of a plurality of actions, wherein each of the plurality of actions corresponds to a configuration of the service;

generating, by the computer system, an adjusted expected value associated with each of the plurality of actions based on the adjusted predicted risk;

selecting, by the computer system, an action from the plurality of actions that maximizes the adjusted expected value associated with the execution of the service based on the adjusted predicted risk; and executing, by the computer system, the action configuring the execution of the service for the user in the distributed services system;

wherein the second set of signals indicative of the expected values comprises at least one of:

a third set of one or more signals generated by a first user value machine learning model trained to detect a probability that each of the plurality of actions will cause the user to stop usage of the service;

a fourth set of one or more signals generated by a second user value machine learning model trained to detect a value amount to the distributed services system that results from usage of the service by the user;

a fifth set of one or more signals generated by a third user value machine learning model trained to detect a value amount added to the distributed services system that results from a usage of the distributed services system by a user system; and a sixth set of one or more signals generated by a fourth user value machine learning model trained to detect a value of a standing of a user system with the distributed services system.

2. The method of claim 1, further comprising:

selecting, by the computer system, a range of test risk values;

performing, by the computer system, testing for each of the range of test risk values against the set of historical service execution data; and selecting, by the computer system, one of the range of test risk values as the test risk value, the selection based on which of the range of test risk values maximizes the policy.

3. The method of claim 1, wherein the test risk value is selected by a second user of the distributed services system.

4. The method of claim 1, further comprising:

monitoring, by the computer system, production expected values determined during execution of the service for the segment of users;

detecting, by the computer system, that a threshold number of the production expected values fail to satisfy the policy; and generating, by the computer system, an alert to a second user of the distributed services system.

5. The method of claim 1, wherein the first set of signals indicative of the predicted risk comprises signals associated with a predicted loss due to fraud associated with the execution of the service.

6. The method of claim 1, wherein the first set of signals indicative of the predicted risk comprises signals associated with a predicted loss due to a failure by the user to satisfy an obligation associated with the execution of the service.

7. The method of claim 1, wherein the one or more first machine learning models and the one or more second machine learning models are independent sets of machine learning models.

8. A non-transitory machine-readable medium, having instructions stored therein, which when executed by a computer system having at least one processor, cause the computer system to perform operations for configuring execution of a service in a distributed services system, the operations comprising:

receiving, by the computer system, a first set of signals generated by one or more first machine learning models, the first set of signals indicative of a predicted risk associated with the execution of the service for a user;

receiving, by the computer system, a second set of signals generated by one or more second machine learning models, the second set of signals indicative of expected values associated with the execution of the service for the user;

determining, by the computer system, a risk value, the risk value indicative of an amount of risk associated with the user, a segment of users associated with the user, or the service to be executed for the user, by:

identifying, by the computer system, the user as a member of the segment of users that use the service of the distributed services system;

selecting, by the computer system, a test risk value;

testing, by the computer system, against a set of historical service execution data, the test risk value by generating test expected values from the historical service execution data for the segment of users adjusted by the test risk value; and when the test expected values adjusted by the test risk value satisfy a policy, setting a value of the risk value with the test risk value;

subsequent to determining the risk value, adjusting, by the computer system, the predicted risk by the risk value;

determining, by the computer system, a corresponding expected value associated with each of a plurality of actions, wherein each of the plurality of actions corresponds to a configuration of the service;

generating, by the computer system, an adjusted expected value associated with each of the plurality of actions based on the adjusted predicted risk;

selecting, by the computer system, an action from the plurality of actions that maximizes the adjusted expected value associated with the execution of the service based on the adjusted predicted risk; and executing, by the computer system, the action configuring the execution of the service for the user in the distributed services system;

wherein the second set of signals indicative of the expected values comprises at least one of:

a third set of one or more signals generated by a first user value machine learning model trained to detect a probability that each of the plurality of actions will cause the user to stop usage of the service;

a fourth set of one or more signals generated by a second user value machine learning model trained to detect a value amount to the distributed services system that results from usage of the service by the user;

a fifth set of one or more signals generated by a third user value machine learning model trained to detect a value amount added to the distributed services system that results from a usage of the distributed services system by a user system; and a sixth set of one or more signals generated by a fourth user value machine learning model trained to detect a value of a standing of a user system with the distributed services system.

9. The non-transitory machine-readable medium of claim 8, wherein the one or more first machine learning models and the one or more second machine learning models are independent sets of machine learning models.

10. A computer system, comprising:

a memory storing one or more instructions; and a processor, coupled with the memory, configured to execute the one or more instructions causing the computer system to perform operations, comprising:

receiving a first set of signals generated by one or more first machine learning models, the first set of signals indicative of a predicted risk associated with execution of a service for a user in a distributed services system;

receiving a second set of signals generated by one or more second machine learning models, the second set of signals indicative of expected values associated with the execution of the service for the user;

determining, by the computer system, a risk value, the risk value indicative of an amount of risk associated with the user, a segment of users associated with the user, or the service to be executed for the user, by:

identifying, by the computer system, the user as a member of the segment of users that use the service of the distributed services system;

selecting, by the computer system, a test risk value;

testing, by the computer system, against a set of historical service execution data, the test risk value by generating test expected values from the historical service execution data for the segment of users adjusted by the test risk value; and when the test expected values adjusted by the test risk value satisfy a policy, setting a value of the risk value with the test risk value;

subsequent to determining the risk value, adjusting, by the computer system, the predicted risk by the risk value;

determining a corresponding expected value associated with each of a plurality of actions, wherein each of the plurality of actions corresponds to a configuration of the service;

generating, by the computer system, an adjusted expected value associated with each of the plurality of actions based on the adjusted predicted risk;

selecting, by the computer system, an action from the plurality of actions that maximizes the adjusted expected value associated with the execution of the service based on the adjusted predicted risk; and executing the action configuring the execution of the service for the user in the distributed services system;

wherein the second set of signals indicative of the expected values comprises at least one of:

a third set of one or more signals generated by a first user value machine learning model trained to detect a probability that each of the plurality of actions will cause the user to stop usage of the service;

a fourth set of one or more signals generated by a second user value machine learning model trained to detect a value amount to the distributed services system that results from usage of the service by the user;

a fifth set of one or more signals generated by a third user value machine learning model trained to detect a value amount added to the distributed services system that results from a usage of the distributed services system by a user system; and a sixth set of one or more signals generated by a fourth user value machine learning model trained to detect a value of a standing of a user system with the distributed services system.

11. The computer system of claim 10, wherein the one or more first machine learning models and the one or more second machine learning models are independent sets of machine learning models.

* * * * *